Nov. 17, 1953 N. C. PRICE 2,659,528
GAS TURBINE COMPRESSOR SYSTEM
Filed Sept. 29, 1948 3 Sheets-Sheet 3

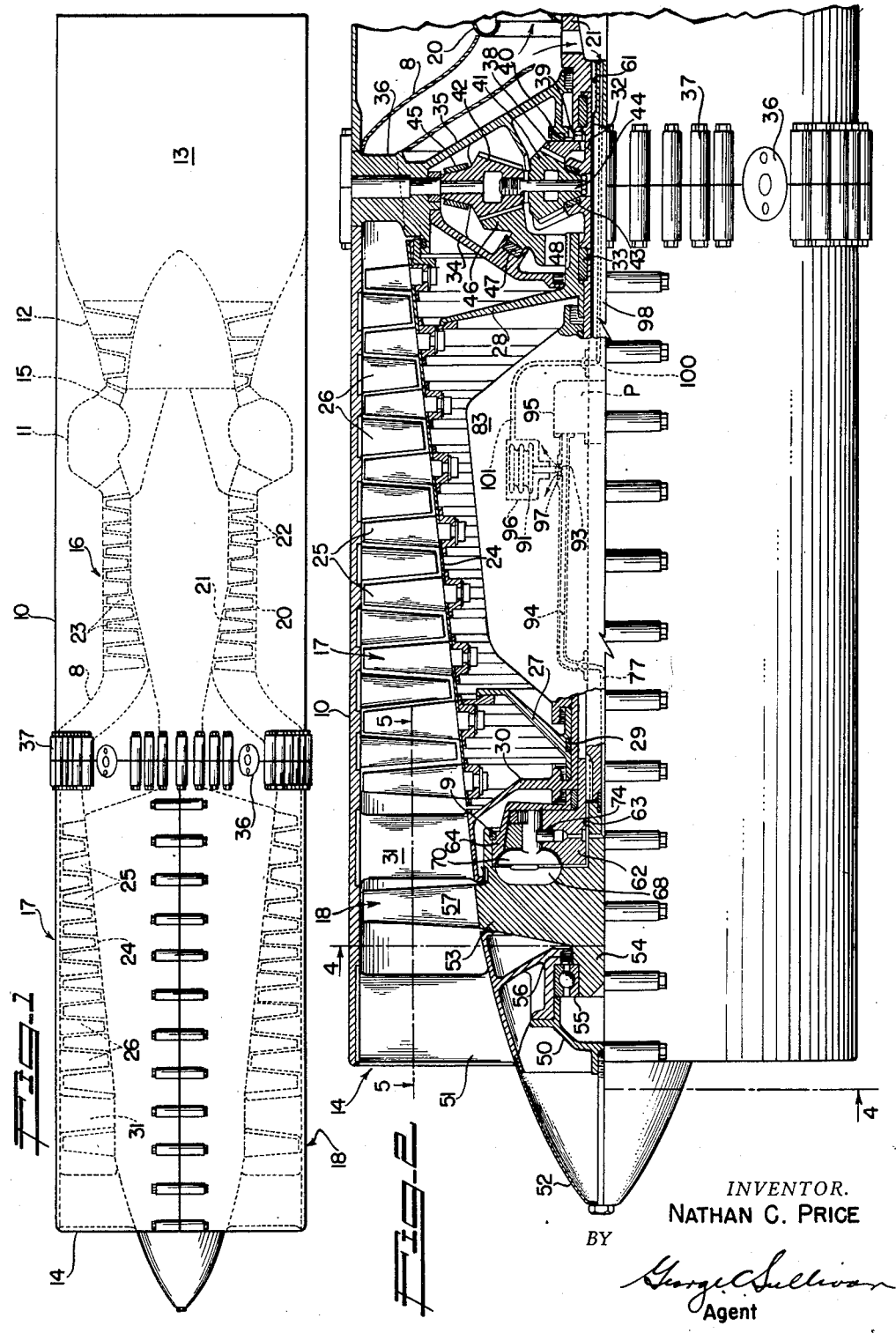

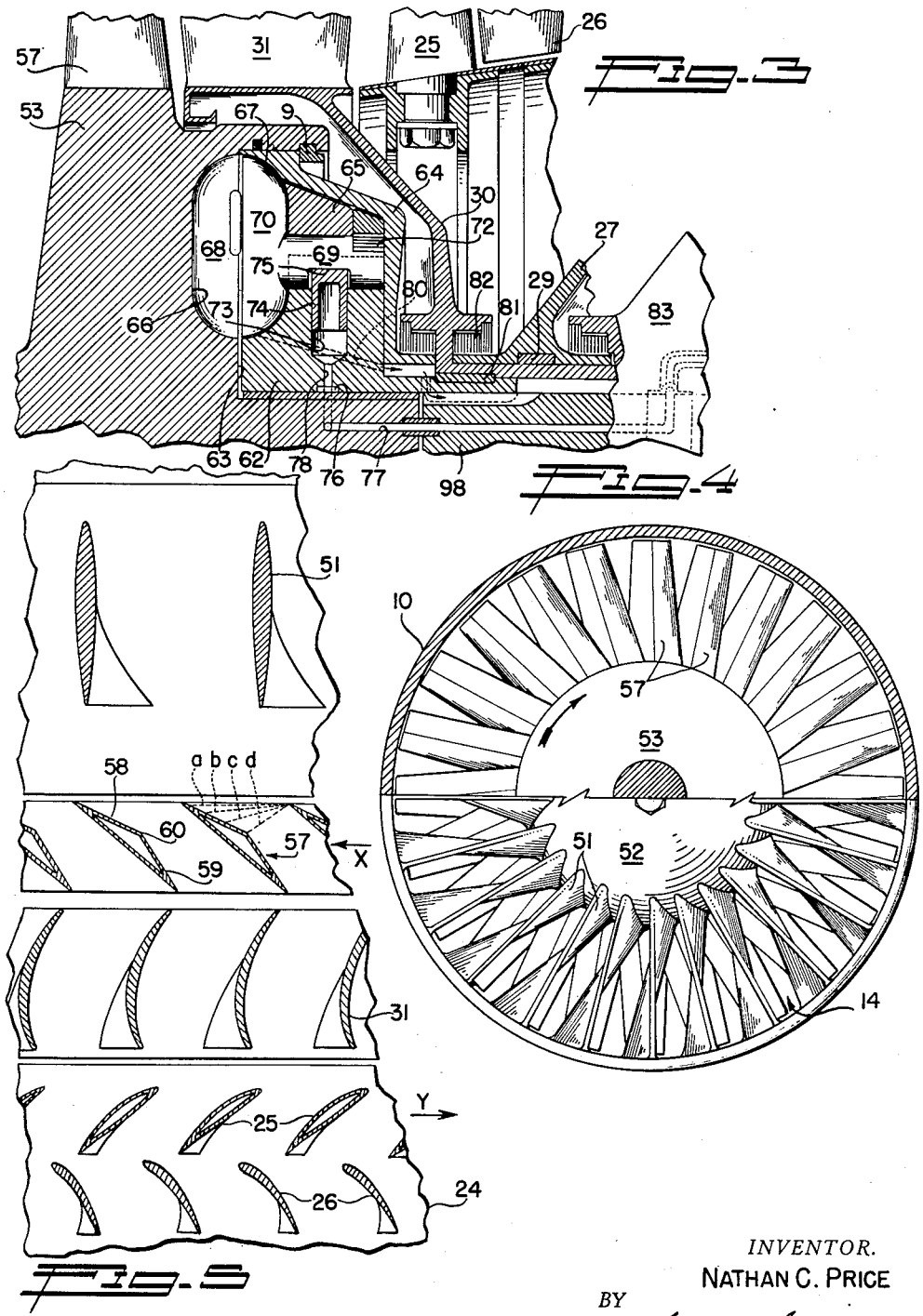

INVENTOR.
NATHAN C. PRICE
BY
George C. Sullivan
Agent

Patented Nov. 17, 1953

2,659,528

UNITED STATES PATENT OFFICE 2,659,528

GAS TURBINE COMPRESSOR SYSTEM

Nathan C. Price, St. Helena, Calif., assignor to Lockheed Aircraft Corporation, Burbank, Calif.

Application September 29, 1948, Serial No. 51,685

11 Claims. (Cl. 230—114)

This invention relates to gas turbine powerplants and relates more particularly to the compressor systems of high pressure gas turbine powerplants intended primarily for the propulsion of aircraft, and the like, the aforesaid compressor systems employing principles of supersonic airflow.

In gas turbine powerplants for the propulsion of aircraft it is necessary, in order to obtain high efficiency, to employ compressors having high compression ratios and the axial flow type of compressor has been found to be satisfactory for this purpose. However, axial flow compressors, more particularly supersonic compressor blading, have rather narrow ranges of stable operation and their efficiency is affected substantially by variations in altitude, ambient air temperature and the speed of the aircraft. Furthermore, special relationships are to be regarded in connection with the ratio of blading tip speed to the acoustic velocity of the air passing through the blading, affecting blading efficency, and the choice of operation in the supersonic or sub-sonic regime. In high pressure gas turbine engines it is necessary to induct a very great volumetric air flow at the inlet, and to deliver this large mass flow of air, under high pressure and greatly reduced volume, to the combustion chambers and the axial flow compressors are employed in multiple stages or compound relation for this purpose. By employing a plurality of compressors in this manner, it becomes possible to drive the individual compressors at different speeds to obtain optimum efficiency. The maximum volumetric flow demand of a compressor system arises at the inlet, where it is found advantageous to operate blading in the supersonic range. However, this requires the establishment of a comparatively high blade tip speed at the inlet suitably controlled, with respect to conditions of the subsequent compressor blading which, in the invention, is operated at an abruptly lower tip speed, in the sub-sonic range, to produce a stabilizing region of highly efficient compression.

It is an object of the present invention to provide a gas turbine powerplant characterized by a multi-stage axial flow compressor system in which the individual compressors are driven and operated in a manner to obtain high compressor efficiency under the variable conditions of operation. In the system of the invention there are three compressor stages or units, two of the units being driven at a known speed differential and the third being driven individually in a manner whereby its rotative speed is varied in accordance with altitude, ambient air temperature and flight speed conditions, said third unit having blading of a different type than the other units, especially suited for high rotative speed operation and capable of increasing the compression ratio and volumetric output of the system. The independent control of the rotative speed of the one stage or unit, which is the foremost or leading unit of the system, corrects or obviates stalling of the earlier blading rows and turbining of the later rows at low rotative speeds and alleviates other phenomena affecting efficiency of the compressor system and of the powerplant as a whole.

Another object of the invention is to provide a powerplant compressor system and drive mechanism of the class referred to wherein the foremost compressor stage is characterized by supersonic blading to afford a several fold increase of power output. The ultimate power capacity of a gas turbine powerplant depends upon the quantity of air which it can induct. This induction reaches a maximum when supersonic blading is used at the engine air inlet, which permits inflow at approximately the velocity of sound. However, supersonic blading has extremely sharp characteristics, and it is desired to carry the remainder of the compression following thereafter in blading of the sub-sonic type, having broader and more easily controllable characteristics. The transition of flow from the supersonic to the sub-sonic blading involves a sharp discontinuity in operating conditions which is satisfactorily compensated for by the construction described hereinafter.

A further object of the invention is to provide a compressor system of the class described wherein the supersonic compressor is driven directly from the turbine shaft assembly through a variable speed hydraulic drive and is not associated structurally with the drive for the second stage compressor.

It is also an object of the invention to provide a compressor system which can be contained within a generally cylindrical casing, having a row of supersonic compressor blading of very high tip speed at the inlet, followed by sub-sonic blading of abruptly lower tip speed, including a construction for a portion of this sub-sonic blading adjacent to the compressor system outlet to be operated at a partially elevated tip speed, to maintain a more or less constant Mach number in all of the sub-sonic compressor blading, preferably a Mach number of between .7 and .8 for best efficiency.

Other objectives and advantages of the invention will become apparent from the following detailed description, throughout which reference is made to the accompanying drawings wherein:

Figure 1 is a side elevation of a powerplant embodying the features of the present invention, with the principal elements appearing in broken lines;

Figure 3 is an enlarged fragmentary vertical detailed sectional view illustrating the hydraulic drive for the supersonic compressor blading and adjacent parts;

Figure 4 is a view taken substantially as indicated by line 4—4 on Figure 2 illustrating the character of the guide vanes and supersonic blading;

Figure 5 is an enlarged developed or schematic view of the forward blading rows of the compressor system taken substantially as indicated by line 5—5 on Figure 2; and Figure 6 is a schematic view illustrating another form of control for the supersonic compressor.

Figure 2:
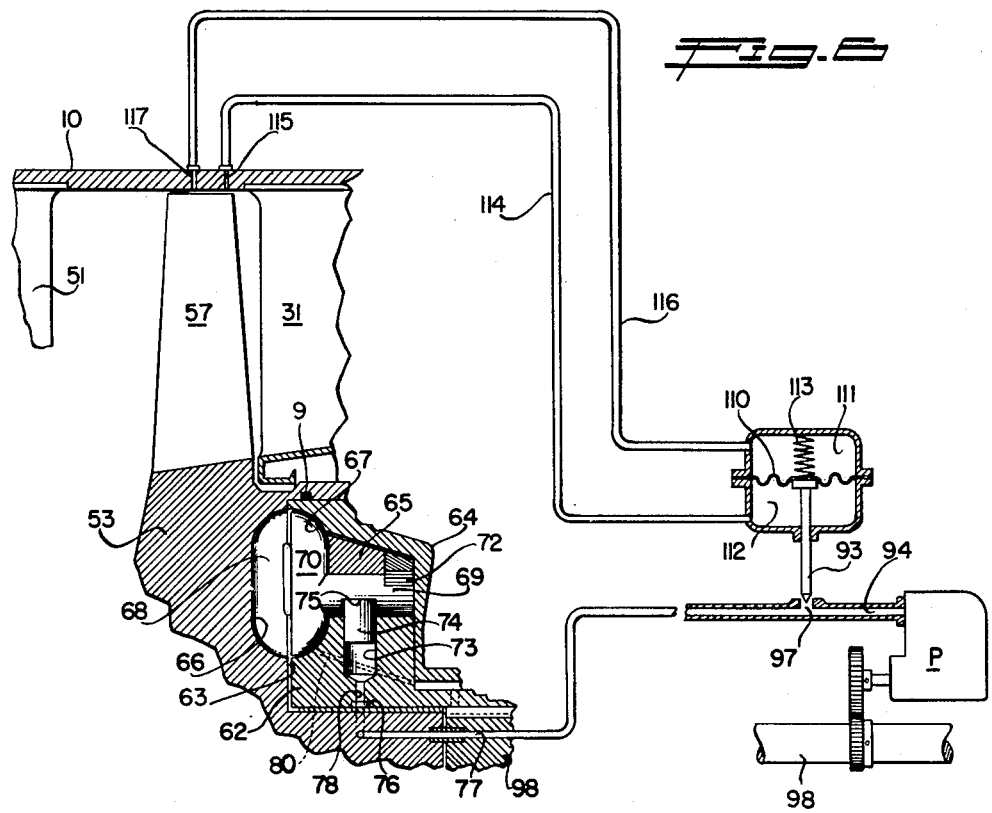
Figure 2 is an enlarged elevational view of the forward portion of the powerplant with the upper part appearing in longitudinal cross section and illustrating one form of control in a diagrammatic manner.

The powerplant illustrated in Figure 1 and which incorporates the features of the invention includes an elongate sectional housing or casing 10. The forward major portion of the casing 10 contains the compressor system of the invention while the rear portion of the casing houses the combustion chamber 11 and turbine 12. The turbine 12 discharges the turbine gases through the tail pipe portion 13 in the form of a propulsive jet. The forward end of the casing 10 is open to form a ram inlet 14 of large volumetric flow capacity for the compressor system. The combustion chamber 11, which may be annular, is supplied with fuel and the compressor system discharges the continuous large mass flow of greatly reduced volume of compressed air into the chamber. The resultant hot combustion gases and air are discharged from the combustion chamber 11 under pressure through a nozzle ring 15 to drive the turbine 12. The turbine 12 in turn drives the compressor system in the manner hereinafter described.

The compressor system of the invention includes a rear or third stage compressor 16, an intermediate or second stage compressor 17, and a front or first stage compressor 18.

The rear, or third stage compressor 16, comprises a tubular and generally cylindrical housing 20 spaced within the intermediate portion of the powerplant casing 10 and a rotor 21 operating within the housing. The housing 20 carries a plurality of rows of inwardly projecting stator blades 22 and the rotor 21, which is of rearwardly increasing diameter, carries a plurality of rows of outwardly projecting impeller blades 23 operating between the rows of stator blades. The rotor 21 of the rear compressor 16 is driven directly by the rotor of the turbine 12 and the compressor and turbine rotors may be so constructed as to constitute a single composite rotor assembly. Ducts 8 deliver or direct the compressed air from the intermediate compressor 17 to the forward end of the housing 20 of the third stage compressor.

The intermediate compressor 17 is arranged ahead of the compressor 16 and includes a hollow or tubular rotor shell 24 of rearwardly increasing diameter. The rotor shell 24 is arranged concentrically within the casing 10 and carries a plurality of rows or stages of outwardly projecting rotor blades 25. The rows of blades 25 operate between rows of stator blades 26 which project inwardly from the wall of the casing 10. The blades 22, 23, 25 and 26 of the compressors 16 and 17 are of the sub-sonic type. The rotor shell 24 of the compressor 17 has a forward hub plate 27 and a rear hub plate 28. A suitable bearing 29 supports the forward hub plate 27 on the tubular central portion of a stationary web 30. The web 30 is in turn carried by a row of stationary diffuser blades 31 arranged ahead of the foremost row of rotor or impeller blades 25. The outer ends of the blades 31 are suitably secured and supported in the casing 10. The rear hub plate 28 of the rotor 24 is mounted on a stationary generally tubular support member 32 through an appropriate bearing 33.

As above described, the rotor 21 of the rear compressor 16 is connected or associated with the turbine rotor to be directly driven thereby. In accordance with the invention a speed reducing drive is provided between the compressors 16 and 17, the drive being from the rotor 21 of the compressor 16 to the rotor 24 of the compressor 17. This drive mechanism includes the above mentioned stationary tubular member 32 and two spaced stationary diaphragms or plates 34 and 35 secured to or formed on spaced radial blocks 36 secured in the wall of the casing 10. As illustrated in the drawings, the casing 10 may be split or divided at the radial blocks 37 to facilitate assembly and the sections of the casing may be secured together by screws or bolts 37. A beveled drive gear 38 surrounds the rear portion of the stationary member 32 and is driven by the forward hub portion of the compressor rotor 21 through end splines or curvic splines 39. A thrust bearing 40, carried by the plate 35, supports the gear 38. Sets of radially disposed cluster pinions 41 and 42 are arranged between the spaced plates 34 and 35. Appropriate bearings 43 support the inner pinions on the member 32 so as to mesh with the drive gear 38. The outer pinions 42, which are connected with the inner pinions 41 by end splines and screws 44, are supported on the plates 34 and 35 by bearings 45. A driven gear 46, of relatively large diameter, meshes with the pinions 42 to be driven thereby and is supported by bearing means 47 on the stationary plate 34. The driven gear 46 is connected with the hub plate 28 of the rotor shell 24 by flexible cushion splines 48. It will be seen that with the structure just described, the rotor 24 of the compressor 17 is driven by the rotor 21 of the compressor 16 at a slower rotative speed than the rotor 21. In a representative case, the blading tip diameter of the compressor 17 is 92% greater than that of the compressor 16 but the rotative speed of compressor 17 is 43% that of the compressor 16, whereby the blading of the two compressors differs only in scale, and it becomes possible to operate the blading of both compressors at similar blade angles and approximately the same relative Mach numbers to attain high efficiency. This similarity, except for scale, also leads to a reduced manufacturing cost in various ways.

In a typical engine of the invention the rated speed of the rear compressor rotor 21 may be 16,800 R. P. M. with a blading tip speed of 925 ft. per second, while the rated speed of the intermediate compressor rotor 24 may be 7,200 R. P. M. with a blading tip speed of 760 ft. per second, it being apparent that the ratio of the speed reduction drive may be varied in different engines, taking into account the change of acoustic velocity of the entrained air, as a result of changing air temperature at various portions of the compressor system, to maintain a substantially constant Mach number in the sub-sonic compressor blading. However, the first stage compressor 18 is revolved up to a speed of 16,500 R. P. M. at times, producing a blade tip speed of 1,750 ft. per second, being well within the supersonic range of compression. A relative velocity of the blading against the air is thereby brought to a value between 1.5 and 2.00 times the velocity of sound at certain times.

The forward end or ram inlet 14 of the casing 10 is preferably equipped with an inlet spider comprising a hub 50 and a set or row of guide vanes 51. The spider is stationary, the vanes 51 being suitably secured in the forward end of the casing 10. The vanes 51 extend radially inward from the wall of the casing 10 and are airfoil shaped in cross section as shown in Figure 5. The vanes 51, in addition to supporting the hub 50, serve to impart an initial swirl or rotation to the ram air entering the compressor system, being set at an angle of incidence relative to the axis of the casing 10 to guide or direct the entering air in this manner. Adjacent to the hub 50 the guide vanes 51 are set to cause the entering air to swirl or rotate in a direction counter to the direction of rotation of the blades of the first stage compressor 18 to increase the efficiency of the compressor but adjacent to the casing 10 the guide vanes cause the inducted air to swirl in the direction of rotation of the blades of the compressor 18. The hub 50 of the inlet spider is supported centrally or coaxially in the casing 10 by the vanes 51 and serves as a bearing housing for the rotor of the first stage compressor as will be later described. The forward end of the hub 50 carries a suitably pointed fairing 52 which, together with the peripheral wall of the hub 50, forms an inner flow boundary aligned with the forward end of the rotor shell 24.

The first or front compressor 18 comprises a rotor 53 arranged between the stationary supporting web 30 and the stationary hub 50 of the inlet spider, to be ahead of or upstream from the rotor 24 of the compressor 17. If desired, the rotor 53 may be a solid disc like member provided at its forward end with a hub part 54 of reduced external diameter which extends into the stationary inlet hub 50. A bearing 55, having an associated seal 56, mounts the part 54 in the hub 50 to support the rotor 53 for free rotation. The periphery of the rotor 53 is substantially flush with the peripheries of the rotor 24 and inlet spider hub 50 and carries a row of supersonic compressor blades 57. The direction of rotation of the supersonic blades 57 is indicated by the arrow X in Figure 5, where it will be seen that the blades 57 are of triangular cross section, each having a plain flat leading face and a trailing side defined by two substantially flat faces 58 and 59 joining at an apex edge 60. As will be seen from an inspection of Figure 5, the supersonic blades 57 have a substantial pitch and, as shown in Figure 4, the blades 57 have a partial solidity, being in axially overlapping relation for some distance outwardly from their roots. In the operation of the powerplant the axial motion of the ram air reaches or approaches the velocity of sound in a plane slightly ahead of the supersonic blades 57. The blades 57, of triangular configuration, eliminate or reduce the propagation of heavy rearwardly traveling shock waves which might otherwise be developed where the velocities are of sonic or supersonic values. In operation, a comparatively gentle initial oblique shock wave $a$ extends from the leading edge of one blade 57 toward the leading edge of the adjacent blade 57 where it sets up interference with or joins other shock waves propagated between the leading edge and the apex line 60, so that heavy waves are avoided in this region. One or more light oblique shock waves such as $b$ and $c$ may be generated prior to the normal wave $d$ thereby approaching adiabatic compression of the air. The employment of the supersonic blades 57 greatly increases the volumetric capacity and raises the compression ratio of the compressor system.

The abovementioned stationary diffuser blades 31 stand between the row of supersonic blades 57 and the first row of sub-sonic blades 25 of the compressor 17, as shown in Figure 5. The row of diffuser blades 31 is shaped to change the direction of flow of the air leaving the supersonic blades 57 to direct it to the blades 25 for the efficient compression of the air. The direction of rotation of the sub-sonic rotor blades 25 is indicated by the arrow Y.

In accordance with the invention the rotor 53 of the compressor 18 is driven by the turbine 12 through a variable speed drive so that the rotational speed of the rotor 53 may be varied in accordance with or to compensate for variations in altitude, ambient air temperature, etc.

The invention in its broader aspects may utilize any appropriate form or type of variable speed drive for the supersonic compressor rotor 53. In an illustrative case, the rotative speed of rotor 53 will be variable, depending on ambient conditions, up to a speed of 98% of the turbine rotor speed. In the particular embodiment of the invention illustrated, a variable speed hydraulic coupling of the type described in United States Letters Patent No. 2,448,825, granted to me September 7, 1948, is employed to drive the rotor 53. A shaft 98 is splined to the forward hub of the rear compressor rotor 21 at 61 and extends forwardly to drive the hydraulic mechanism. The rotor or drive element 62 of the hydraulic drive may be an annular part splined to the forward end of the shaft 98 and substantially received in an annular recess 63 in the rear face of the rotor 53 of the supersonic compressor 18. A cover plate or ring 64 is held in the recess 63 by a snap-ring 9, or the equivalent, and extends inwardly across the rear side of the driver element 62. A floating ring 65 is arranged in the plate 64 outwardly of the driver element 62. The ring 65 may rotate with the driver element 62 but is free for at least limited angular movement relative to the element 62.

The wall of the abovementioned recess 63 has an annular depression or groove 66 concentric with the axis of rotation of the rotor 53 and the opposing surfaces of the driving element 62 and ring 65 have a complementary groove 67 which, together with the groove 66, forms a chamber. Vanes 68 are provided on the wall of the groove 66 and shafts or shanks 69 carried in axial grooves in the driver element 62 support vanes 70 within the groove 67. The shanks 69 are adapted to be turned or rotated to vary the angle of the vanes 70. The floating ring 65 and the vane shanks 69 have meshing splines or teeth 72 so that the ring serves to maintain the several vanes 70 in the same angular position when the drive is idle, etc.

Means is provided for varying the angle of the vanes 70 associated with the driver element 62. This means includes a radial cylinder 73 formed in the driver element adjacent each vane shank 69. Pistons or plungers 74 operate in the cylinder bores 73 and cooperate with cam faces 75 on the shanks 69 of the vanes 70. An annular groove 76 in the driver element 62 is supplied with liquid under pressure by a port system 77 extending through the shaft 98 and radial ports 78 connect the inner ends of the cylinders 73 with the grooves 76. It will be seen that by varying the pressure on the liquid supplied to the cylinders 73 the angle of the series of vanes 70 may be changed to control or vary the transmission of torque through the hydraulic coupling.

The chamber defined by the grooves 66 and 67 contains a liquid which may be replenished by leakage from the cylinders 73 together with any additional circulation if required, from another flow source. A return port 80 leads through the driver element 62 past the bearing 81 which mounts the element in the stationary web 30. The liquid lubricates the bearing 81 and passes therethrough into a reservoir 83 housed in the rotor shell 24. Suitable seals 82 at the web 30 and reservoir 83 prevent the leakage of liquid from the hydraulic mechanism and from the reservoir.

The compressor system of the invention includes a control means for regulating the speed of the supersonic blades 57. Figure 2 of the drawings illustrates in a diagrammatic manner one representative form of such a control means which includes an evacuated bellows 91 housed with a capsule 96. In the particular case illustrated, the capsule 96 is stationarily associated with the stationary reservoir 83, it being understood that the capsule may be supported in other positions. The capsule 96 is closed or sealed except for a line or duct system which maintains the interior of the capsule in communication with the outlet region of the second stage compressor 17. In the diagrammatic illustration of Figure 2, this duct system includes a line and port system 100 leading from the interior of the capsule 96 through the shaft 98 to the interior of the rotor 21 where it has communication with the compressor duct 8. The air pressure at the outlet of the compressor 17 is continuously supplied to the interior of the capsule 96 by the port system 100 to act upon the evacuated bellows 91.

The control means for regulating the speed of the supersonic blading 57 further includes a pump 95 driven by the shaft 98 and drawing oil, or the like, from the reservoir 83 to supply it under pressure to a tube 94 leading to the abovementioned port system 77. The pressure in the port system 77 and therefore the pressure applied to the plungers 74 of the hydraulic drive is regulated by a needle 93 which is movable to vary the opening in a bleed port 97 in the wall of the tube 94. The bleed port 97 may discharge directly into the reservoir 83. The needle 93 is attached to the free end of the bellows 91 to be moved in response to variations in the outlet pressure of the compressor 17. Therefore, when a predetermined air pressure is attained at the discharge of the second stage compressor 17, the resultant deflection of the bellows 91 draws the needle 93 from the port 97, reducing or limiting the pressure applied to the plungers 74 thereby adjusting the speed of rotation of the supersonic blading 57 to establish a given pressure at the outlet of the compressor 17. It will be apparent how the control means just described serves to automatically regulate the hydraulic drive for the row of supersonic blades 57 to preserve an efficient, stabilized condition in the compressor system.

Figure 6 illustrates another representative form of control means for the hydraulic drive of the supersonic compressor 16. In this case, the needle 93, controlling the bleed port 97 of the tube 94, is secured to a flexible diaphragm 110. The diaphragm 110 divides the interior of a sealed capsule into two chambers 111 and 112. The diaphragm 110 and the needle 93 are urged toward the port 97 by a compression spring 113. A tube or duct 114 leads from the chamber 112 to a port or pressure tap 115 in the wall of the casing 10 and a similar duct 116 leads from the chamber 111 to a pressure tap 117 in the wall of the casing. The pressure taps 115 and 117 are located very slightly downstream from the opposite margins of the average normal cross sectional region of the normal shock wave at the supersonic blading 57. With this arrangement the pressure at the tap 115 is applied to one side of the diaphragm 110 to urge the needle 93 toward an open position while the pressure at the tap 117 is applied to the other side of the diaphragm to urge the needle 93 toward the closed position. In the operation of this form of control the rotative speed of the row of supersonic blading 57 is automatically maintained at a value at which the average region of the normal shock wave is bordering the edge of or just passing over the pressure tap 117. In the event the speed of the row of blades 57 increases to the extent that the region of the normal shock wave passes beyond the tap 117 the pressure in the chamber 111 is reduced so that the pressure in the chamber 112 moves the needle 93 outwardly. This reduces or limits pressure applied to the plungers 74 so that less torque is transmitted to the hydraulic drive and the speed of the blades 57 is thus reduced. In the event the speed of the blades 57 is reduced below the proper value, the reduced differential in pressures in the chambers 111 and 112 permits the needle 93 to move toward the closed position under the action of the spring 113 thus increasing the pressure applied to the plunger 74 to increase the torque transmitted to the blading row 57, bringing the speed of the supersonic compressor up to the correct value.

Having described only typical forms of the invention I do not wish to be limited to the specific details herein set forth, but wish to reserve to myself any variations or modifications that may appear to those skilled in the art and fall within the scope of the following claims.

I claim:

1. A compressor system for a turbo powerplant having a turbine rotor element, said system comprising a final stage compressor driven by said element and supplying compressed air to the powerplant, an intermediate stage compressor delivering compressed air to the final stage compressor, a speed reducing drive connecting the intermediate stage compressor with the final stage compressor to be driven thereby, a first stage compressor ahead of the intermediate stage compressor for delivering compressed air thereto, the first stage compressor being characterized by supersonic blading, and a variable speed drive, connecting the first stage compressor with the final stage compressor to be driven thereby.

2. A compressor system for a turbo powerplant having a rotating turbine element, said system comprising first, second and third stage axial flow compressors arranged in compounded relation and supplying compressed air to the powerplant, a drive connecting said turbine element and a third stage compressor whereby the third stage compressor has a rotational speed substantially the same as the turbine element, a speed reduction drive connecting the second and third stage compressors whereby the second stage compressor is driven at a slower rotational speed than the third stage compressor, and a variable speed drive mechanism connecting the first stage compressor with the third stage compressor.

3. A compressor system comprising at least three rows of compressor blading arranged in compound relation, a gear box connecting the discharge and intermediate rows, and a power source connected with the inlet row to drive the same at a Mach number exceeding 1.0 and connected with the outlet row to drive the intermediate and outlet rows at Mach numbers between 0.7 and 0.8, the diameter of the intermediate blading row being substantially greater than that of the outlet row.

4. A compressor system for a gas turbine powerplant comprising first, second and third stage axial flow compressors arranged in series relation, a direct drive between the turbine and third stage compressor, a speed reducing gear drive between the third and second stage compressors for driving the second stage compressor at a slower speed than the third stage compressor, the gear drive comprising a driving gear associated with the third stage compressor, a driven gear associated with the second stage compressor, a stationary structure having an axial opening therethrough, and sets of radially disposed cluster pinions carried by said structure and meshing with said gears, and a shaft connected with the third stage compressor to be driven by the turbine and passing through said opening and connected with the first stage compressor to drive the first stage compressor.

5. A compressor system for a gas turbine including a casing, a series of compressors in the casing, the first compressor of said series including a rotor, and supersonic blading on the rotor, means for transmitting power from the turbine to the compressors to drive the same including a shaft rotated by power from the turbine, a hydraulic coupling connecting the shaft with said rotor including a fluid pressure actuated means operable to vary the speed of the rotor, a control for said fluid pressure actuated means comprising a device for varying the application of fluid pressure to said means, a diaphragm for operating said device, two pressure taps in the wall of the casing adjacent the opposite margins of the region of the normal shock wave at the tip path of said blading, and ducts leading from said taps to the opposite sides of the diaphragm.

6. In a gas turbine power plant having a turbine rotor; the combination of a first stage compressor including a rotor and supersonic blading on the rotor, a second stage compressor downstream from the first stage compressor, a third stage compressor downstream from the second stage compressor and including a rotor connected with the turbine rotor to rotate therewith, a speed reducing drive connecting the second stage compressor with the rotor of the third stage compressor for driving the second stage compressor at a slower rotational speed than the third stage compressor, and a variable speed drive connecting the rotor of the first stage compressor with the rotor of the third stage compressor to drive the first stage compressor, said turbine rotor providing the power for operating said three compressors.

7. In a power plant having a power-providing turbine rotor; a compressor system for the power plant comprising first, second and third stage axial flow compressors arranged in compounded relation and supplying compressed air to the power plant, the third stage compressor including a rotor attached to the turbine rotor so as to therewith constitute a composite rotor assembly, a speed reduction drive connecting the second stage compressor with said rotor assembly whereby the second stage compressor is driven at a slower rotational speed than said rotor assembly, and a variable speed drive mechanism connecting the first stage compressor with said composite rotor assembly whereby the first stage compressor is driven by said rotor assembly, the first stage compressor being of the supersonic type, and the second and third stage compressors being of the sub-sonic type.

8. A compressor system for a gas turbine power plant having a power producing turbine rotor, said system comprising first and second stage compressors arranged in serial relation, a cylindrical casing for the compressors, a driving member directly connected with the turbine rotor to rotate therewith, a gear drive connecting the member and the second stage compressor for driving the latter at sub-sonic velocities, and a variable speed drive connecting the first stage compressor with the driving member for driving the first stage compressor at supersonic velocities.

9. A compressor system for a turbo powerplant having a turbine comprising the combination of; a series of first, second and third stage axial flow compressors, the first of said series being a supersonic compressor and the other compressors of the series being of the sub-sonic type; means connecting the third stage compressor with the turbine to be driven thereby; a shaft driven by the third stage compressor; a variable speed coupling connecting said first stage compressor with the shaft to be driven thereby, the coupling including fluid pressure actuated means operable to vary the speed of rotation of said first stage compressor; a control device in communication with said pressure actuated means operable in response to varying air pressures to supply variable fluid pressure to said pressure actuated means; duct means maintaining said device in communication with a region of said series of compressors downstream from said first stage compressor to operate said control device and thus vary the speed of said first stage compressor, and drive means operatively connecting the second stage compressor with the third stage compressor to be driven thereby.

10. A compressor system for a turbo powerplant having a turbine, said system including a series of axial flow compressors, the first of said series being a supersonic compressor and the other compressors of the series being of the sub-sonic type; means operatively connecting the third stage compressor with the turbine to be driven thereby; a shaft driven by the third stage compressor; a variable speed hydraulic coupling connecting said shaft with said first compressor, said coupling including fluid pressure actuated means operable to vary the speed of said first compressor; means for supplying actuating fluid pressure to said pressure actuated means of the coupling; an air pressure actuated device for varying the application of said actuating fluid pressure to said pressure actuated means and thus vary the speed of said first compressor; means for conducting air pressure from said series of compressors to said device to actuate the same; and means operatively connecting the second stage compressor with the third stage compressor to be driven thereby.

11. A compressor system for a gas turbine including a casing, a series of compressors in the casing, the first compressor of said series including a rotor, and supersonic blading on the rotor, means for transmitting power from the turbine to the compressors to drive the same including a shaft rotated by power from the turbine, a hydraulic coupling connecting the shaft and said rotor including a fluid pressure actuated means operable to vary the speed of the rotor, a control for said fluid pressure actuated means comprising a device for varying the application of fluid pressure to said means, air pressure actuated means operatively connected with said device, and ducts communicating with the region of the normal shock wave in the casing adjacent the tip path of said blading to receive air pressure from said region and communicating with said air pressure actuated means to supply air pressure thereto to operate the same.

NATHAN C. PRICE.

References Cited in the file of this patent

UNITED STATES PATENTS

| Number | Name | Date |
|---|---|---|
| 1,947,477 | Lysholm | Feb. 20, 1934 |
| 2,283,434 | Halford et al. | May 19, 1942 |
| 2,346,032 | Kinnucan | Apr. 4, 1944 |
| 2,405,723 | Way | Aug. 13, 1946 |
| 2,409,176 | Allen | Oct. 15, 1946 |
| 2,435,236 | Redding | Feb. 3, 1948 |
| 2,461,931 | Smith et al. | Feb. 15, 1949 |
| 2,528,635 | Bell et al. | Nov. 7, 1950 |

FOREIGN PATENTS

| Number | Country | Date |
|---|---|---|
| 505,829 | Great Britain | May 17, 1939 |